US010289455B2

United States Patent
Guo et al.

(10) Patent No.: US 10,289,455 B2
(45) Date of Patent: May 14, 2019

(54) GRAPHICAL DISPLAY FOR ILLUSTRATING RESOURCE MANAGEMENT

(71) Applicant: VMware, Inc., Palo Alto, CA (US)

(72) Inventors: Shugang Guo, Shanghai (CN); Jin Feng, Shanghai (CN); Yixiang Zhang, Shanghai (CN); Zhaohui Guo, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 323 days.

(21) Appl. No.: 15/378,069

(22) Filed: Dec. 14, 2016

(65) Prior Publication Data

US 2018/0165132 A1    Jun. 14, 2018

(51) Int. Cl.
  *G06F 9/44*  (2018.01)
  *G06F 9/50*  (2006.01)
  *G06T 11/20*  (2006.01)
  *G06F 11/30*  (2006.01)
  *G06F 11/32*  (2006.01)
  *G06F 11/34*  (2006.01)

(52) U.S. Cl.
  CPC .......... *G06F 9/5077* (2013.01); *G06F 11/301* (2013.01); *G06F 11/3006* (2013.01); *G06F 11/3072* (2013.01); *G06F 11/32* (2013.01); *G06F 11/3433* (2013.01); *G06F 11/3442* (2013.01); *G06T 11/206* (2013.01); *G06F 2201/81* (2013.01); *G06F 2201/875* (2013.01)

(58) Field of Classification Search
  CPC ....................................................... G06F 9/44

USPC .............................................................. 718/1
See application file for complete search history.

(56) References Cited

U.S. PATENT DOCUMENTS

| | | | |
|---|---|---|---|
| 6,785,881 B1 * | 8/2004 | Bartz | G06F 8/34 717/110 |
| 2003/0006988 A1 * | 1/2003 | Alford, Jr. | G06T 17/00 345/440 |
| 2009/0113338 A1 * | 4/2009 | Hamilton, II | G06T 19/00 715/781 |
| 2013/0152051 A1 * | 6/2013 | Rapp | G06F 11/3664 717/125 |

* cited by examiner

*Primary Examiner* — Jae U Jeon
(74) *Attorney, Agent, or Firm* — SU IP Consulting

(57) ABSTRACT

A method to present information associated with a group of virtual components in a virtualized environment includes collecting a first resource usage data and a second resource usage data associated with a virtual component of the group of virtual components. In response to a region of the graphical representation associated with a difference between the first resource usage data and the second resource usage data exceeding a threshold, the method also includes collecting first graphical representation rendering information to render the first resource usage data as a first graphic in the graphical representation, collecting second graphical representation rendering information to render the second resource usage data as a second graphic in the graphical representation, and collecting third graphical representation rendering information including a reduction factor to reduce the region in the graphical representation to a third graphic in the graphical representation.

17 Claims, 4 Drawing Sheets

GRAPHICAL DISPLAY FOR ILLUSTRATING RESOURCE MANAGEMENT

BACKGROUND

VMware vSphere® is a suite of virtualization software for implementing and managing virtual machine (VM) infrastructure. As the infrastructure becomes increasingly complex, monitoring the performances of such infrastructure effectively becomes challenging. For example, to enable a user to visualize and analyze performance data, such as the performance data associated with a host supporting vSphere, one or more VMs running on one or more hosts, and/or one or more objects of VMware vSAN™, graphical representations of one or more resource usage data of a virtual component or a host in the VM infrastructure may be presented to the user. Some example performance data may include, central processing unit (CPU) consumption, memory consumption, storage consumption, input/output operations per second (IOPS), latency, and/or bandwidth. However, conventional graphical representations often fail to highlight relevant data in an efficient and easy-to-understand manner.

DETAILED DESCRIPTION

Figure 1:
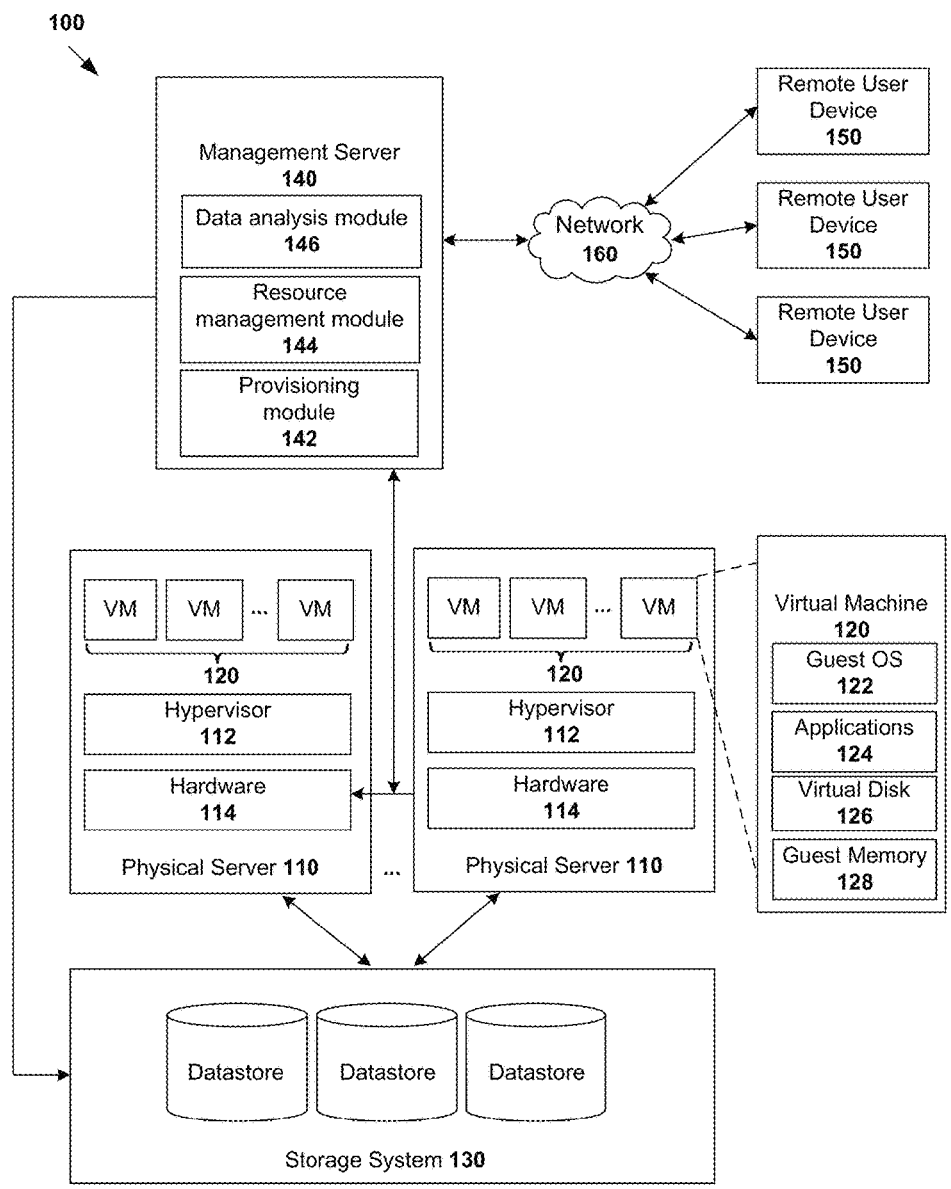
FIG. 1 is a schematic diagram of an example virtualized computing environment, in accordance to at least some examples in the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 is a schematic diagram of an example virtualized computing environment 100, in accordance to at least some examples in the present disclosure. Although an example is shown, it should be understood that example virtualized computing environment 100 may include additional or alternative components, and may have a different configuration.

Virtualized computing environment 100 includes physical servers 110 (also known as "hosts" or "VM ESXi™ hosts") that each execute a hypervisor 112 and include a suitable physical hardware 114 to support multiple virtual machines 120. Hypervisor 112 maintains a mapping between resources allocated to virtual machines 120 and physical resources provided by physical servers 110 and a storage system 130. In practice, there may be any suitable number of physical servers 110, each supporting any suitable number of virtual machines 120.

vSAN is one of the objects in virtualized computing environment 100. vSAN aggregates physical hardware storage resources (e.g., solid state disk, magnetic disk, and etc.) from physical hardware 114 in one cluster to form global datastores of storage system 130. vSAN may split objects among physical servers 110 in the cluster for performance or data security purposes. The various memory usage information associated with physical servers 110 and virtual machines 112 may be collected by a management server 140, which is then sent to remote user devices 150 to be rendered as a graphical representation on a display of remote user devices 150. Management server 140 supports various services that may be accessed by remote user devices 150 via a network 160, such as using an application programming interface (API). Remote user devices 150 may be operated by any suitable users, such as system administrators, organization administrators, database users, application developers, system architects, etc. Any suitable computing device may be used as remote user device 150, such as desktop computer, mobile device, tablet computer, and personal digital assistant, etc.

Management server 140 may include any suitable modules to support the services. For simplicity, in the example illustrated in FIG. 1, management server 140 includes a provisioning module 142 for the provisioning and management of virtual machines 120, a resource management module 144 (also known as "resource scheduler") for the management of resources in virtualized computing environment 100, and a data analysis module 146 for the analysis of the resource usage data associated with physical servers 110 and virtual machines 112. Management server 140 may also support services relating to the deployment of an automated, on-demand cloud infrastructure, such as the delivery and management of private and hybrid cloud services, deployment across multi-vendor, multi-cloud infrastructure, application design process streamlining, application release automation, etc.

In practice, management server 140 may be implemented by multiple physical machines. The consideration as to whether management server 140 is implemented on one or multiple physical machines may depend on the performance of the underlying machines.

When any of virtual machines 120 is created via provisioning module 142, a certain amount of resources is allocated to virtual components (e.g., a virtual disk 126 and/or a guest memory 128) of virtual machine 120, such as to support a guest operating system 122 and applications 124. For example, the allocated resources may include CPU resources (e.g., processors), memory resources (e.g., guest memory 128 supported by random access memory), network resources (e.g., access networks, group of ports, etc.) and storage resources (e.g., virtual disk 126 supported by storage system 130), etc.

A pool of CPU and memory resources of physical servers 110 may be bundled and assigned as a "resource pool" to one of virtual machines 120. For example, memory resources in the resource pool may be allocated in the form of "guest memory 128," which may generally refer to a memory to any of guest operating system 122. Storage resources may be allocated in the form of the "virtual disk" 126, which may generally refer to file or files on a file system that appear as a single hard disk to guest operating system 122. Virtual disk 126 is generally used to store data relating to guest operating system 122 and applications 124.

Resource management module 144 may use information relating to virtual machines 120 (e.g., provided by provisioning module 142) to manage how CPU, memory, storage and network resources are allocated to different virtual machines 120. In some embodiments, resource management module 144 monitors virtual machines 120 and updates their status based on how they utilize resources allocated to them. For example, resource management module 144 may collect various resource usage data of a virtual component (e.g., guest memory 128) and/or a physical hardware resource provided by physical servers 110. In some embodiments, resource management module 144 may collect an amount of guest memory 128 that is being used by virtual machine 120, an amount of guest memory 128 shared through transparent page sharing within one virtual machine 120 or among different virtual machines 120, an amount of physical memory provided by physical servers 110 allocated to one or more virtual machine 120s, an amount of guest memory 128 currently backed by physical memory provided by physical servers 110, an amount of guest memory 128 that is currently reclaimed through a balloon driver, an amount of guest memory 128 swapped out to a swap device of virtual machine 120, and etc. The collected resource usage is then analyzed by data analysis module 146.

Figure 2A:
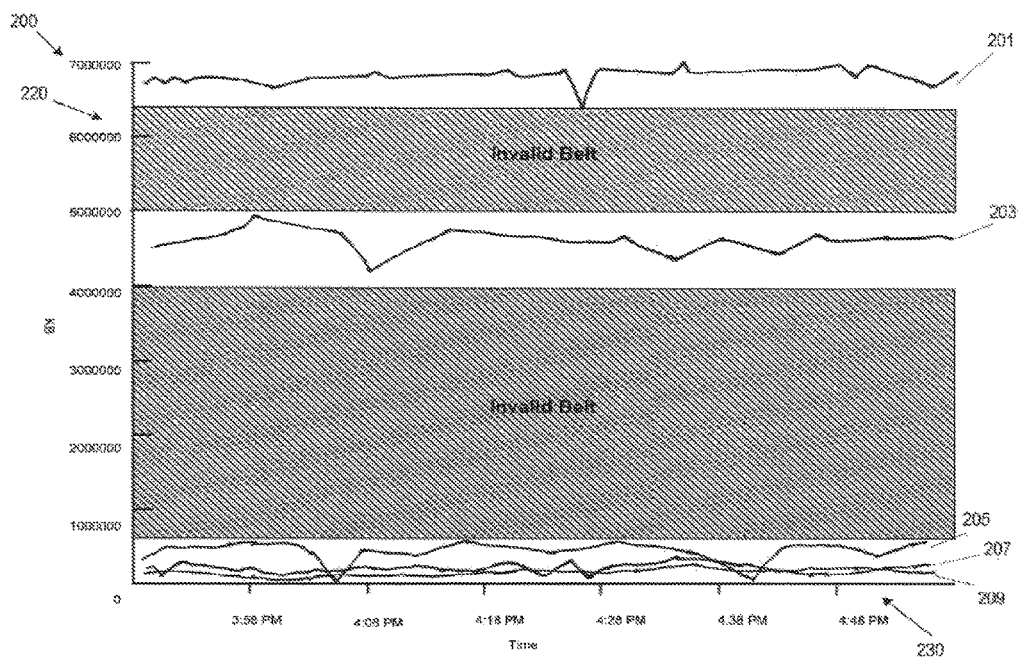
FIG. 2A shows a conventional graphical representation of a performance data analysis chart in an example virtualized computing environment.

FIG. 2A shows a conventional graphical representation 200 of a performance analysis chart. Conventional graphical representation 200 may include a first axis 220, a second axis 230, a first curve 201, a second curve 203, a third curve 205, a fourth curve 207, and a fifth curve 209. First curve 201 is illustrated to fit a first series of resource usage data points. Similarly, second curve 203, third curve 205, fourth curve 207, and fifth curve 209 are illustrated to fit a second series of resource usage data points, a third series of resource usage data points, a fourth series of resource usage data points, and a fifth series of resource usage data points, respectively. First axis 220 and second axis 230 may form a Cartesian coordinate system.

Figure 2B:
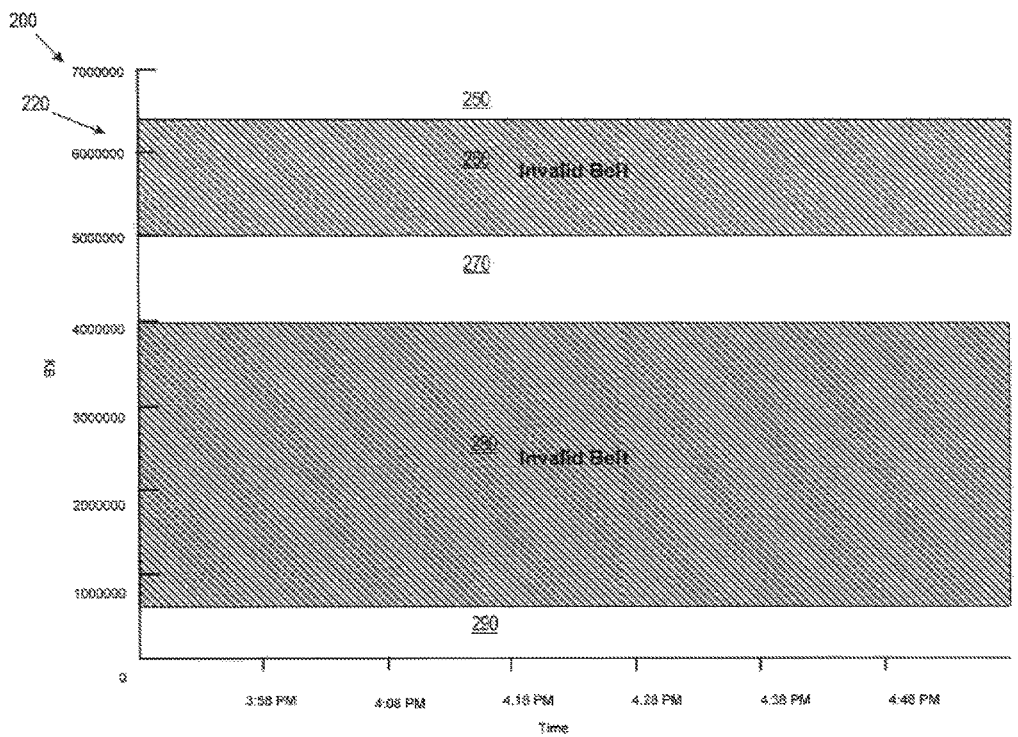
FIG. 2B shows categorized regions of an example graphical representation, in accordance to at least some examples in the present disclosure.

In some embodiments, graphical representation 200 may be categorized into different regions to facilitate the interpretation of curves 201, 203, 205, 207, and 209. FIG. 2B shows categorized regions of an example graphical representation 200, in accordance to at least some examples in the present disclosure. In conjunction with FIG. 2A, the graphical representation 200 may be categorized to regions 250, 260, 270, 280, and 290. In some embodiments, a "data region" may refer to a region on graphical representation 200 that includes at least one series of resource usage data points, and an "empty region" may refer to a region on graphical representation 200 that does not include any resource usage data points. Regions 250 and 270 may be considered as the data regions, since region 250 includes the first series of resource usage data points, and region 270 includes the second series of resource usage data points. Regions 260 and 280 may be considered as the empty regions, since the two regions include no series of resource usage data points. Among the data regions, a region including more than one series of resource usage data points may be further categorized to a "joined data region." One example joined data region may be region 290, which includes multiple series of resource usage data points, such as the third series of resource usage data points, fourth series of resource usage data points, and fifth series of resource usage data points.

In some embodiments, to facilitate the interpretation of curves 201, 203, 205, 207, and 209, empty regions 260 and 280 may be reduced, and data regions 250 and 270 and joined data region 290 may instead be enlarged.

Figure 3:
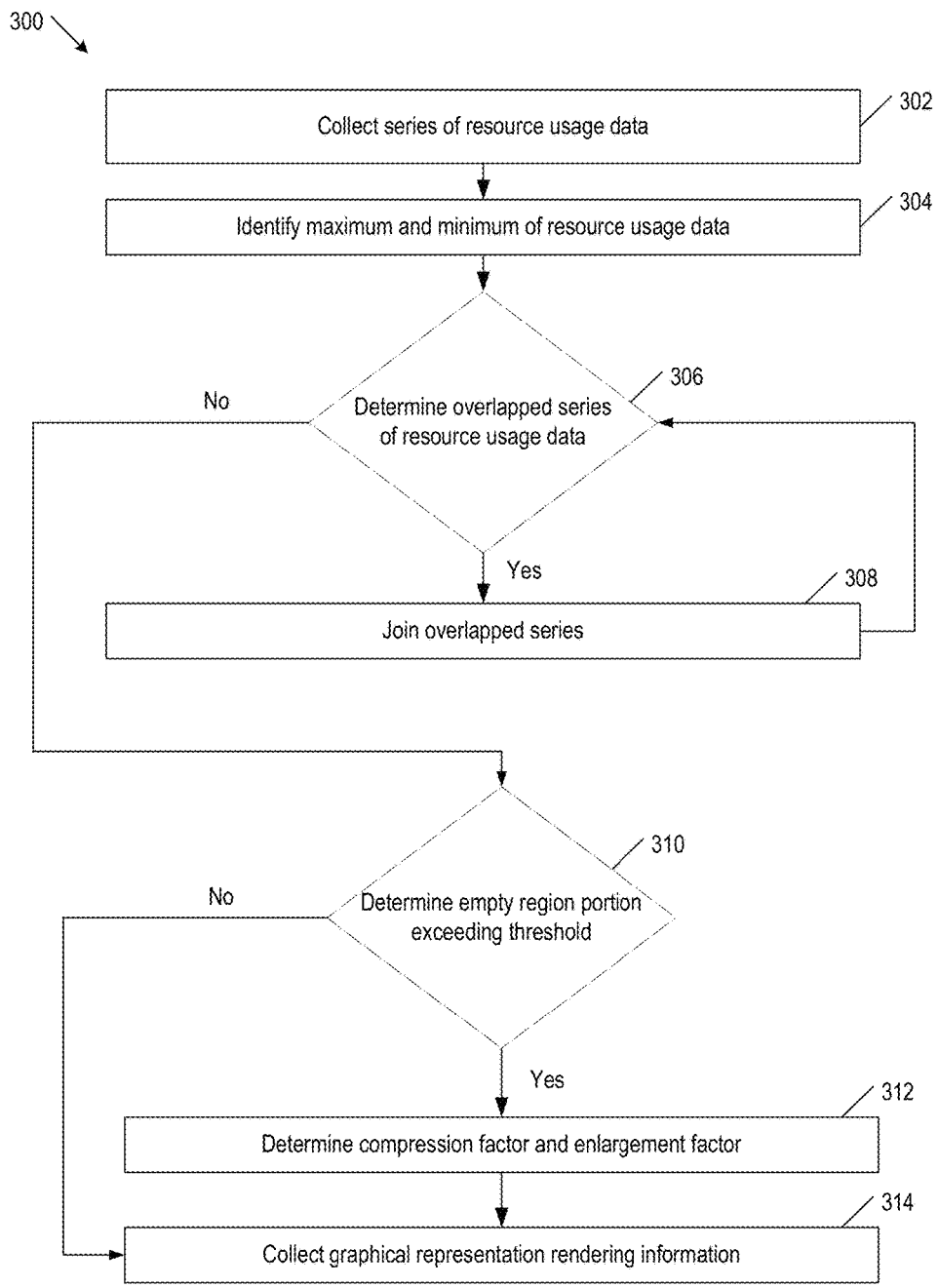
FIG. 3 is a flowchart of an example process to render a graphical representation, in accordance to at least some examples in the present disclosure.

FIG. 3 is a flowchart of an example process 300 to render a graphical representation, in accordance to at least some examples in the present disclosure. The example process 300 may include one or more operations, functions, or actions illustrated by one or more blocks, such as 302 to 314. The various blocks may be combined into fewer blocks, divided into additional blocks, and/or eliminated depending on the desired implementation. In some embodiments, one or more blocks of the various blocks may be performed by management server 140, remote user device 150, or a combination of management server 140 and remote user device 150 illustrated in FIG. 1.

Example process 300 may begin in block 302. In block 302, different series of resource usage data are collected. Some example resource usage data may include, without limitation, the resource usage data of one or more virtual components (e.g., virtual disk 126 and guest memory 128) and/or one or more physical hardware (e.g., central processing unit (CPU), memory, storage, and network of physical servers 110). A series of resource usage data may refer to any of the series of resource usage data points represented by curves 201, 203, 205, 207, or 209 in FIGS. 2A and 2B. Block 302 may be followed by block 304.

In block 304, the maximum values in interest and the minimum values in interest of the different series of resource usage data points are identified. For example, in conjunction with FIG. 2A, the first series of resource usage data points represented by first curve 201 has a maximum value in interest (e.g., memory amount) on first axis 220 and a minimum value in interest on first axis 220. Similarly, the second series of data points, third series of data points, fourth series of data points, and fifth series of data points each has its maximum value and minimum value in interest on first axis 220. Block 304 may be followed by block 306.

In block 306, process 300 determines whether two or more series of resource usage data points are overlapped. In some embodiments, the two or more series of resource usage data points are sorted according to their corresponding minimum values by the ascending order. The first series of resource usage data points are overlapped with the second series of resource usage data points if the maximum value in interest of the first series of resource usage data points is larger than the minimum value in interest of the second series of resource usage data points. In some embodiments, the determination may start with a k-means clustering approach to identify two or more series of resource usage data points to compare their corresponding maximum values and minimum values. In response to a determination that two series of resource usage data points are overlapped, block 306 may be followed by block 308, in which process 300 joins the overlapped first and second series of resource usage data points. In some embodiments, the joined series of resource usage data points have a maximum value in interest and a minimum value in interest. The maximum value may be the maximum of all resource usage data points among the overlapped first and second series of resource usage data points. The minimum value may be the minimum of all resource usage data points among the overlapped first and second series of resource usage data points. In some embodiments, block 308 may be looped back to block 306 where process 300 determines whether the joined series of resource usage data points overlaps to other series of resource usage data points.

In response to a determination that no more series of resource usage data points are overlapped, block 306 may be followed by block 310. In block 310, according to a determined graphical representation, a portion of one or more empty regions of the graphical representation is determined and then is compared to a threshold. In some embodiments, in conjunction with FIG. 2B, based on a graphical representation selected by the user with remote user device 150, line chart for example, a rectangular data region 250 in FIG. 2B may be illustrated on a display of remote user device 150 and determined based on the maximum and the minimum memory amounts of the first series of resource usage data points. Similarly, a rectangular data region 270 in FIG. 2B may be determined based on the maximum and the minimum memory amounts of the second series of resource usage data points. In addition, a rectangular joined data region 290 in FIG. 2B may be determined based on the maximum and the minimum memory amounts (i.e., maximum and minimum memory amounts of the third series of resource usage data points) of the joined series of resource usage data points (i.e., the third series of resource usage data points, fourth series of resource usage data points, and fifth series of resource usage data points).

After all data regions (e.g., regions 250, 270, and 290) are determined, a region on the graphical representation 200 between any two data regions is determined as an empty region (e.g., regions 260 and 280). In block 310, a portion of one or more empty regions on graphical representation 200 is calculated. In response to the calculated portion equals to or greater than a threshold (e.g., 60% of graphical representation 200), block 310 may be followed by block 312.

In response to the calculated portion less than a threshold (e.g., 60% of the graphical representation 200), block 310 may be followed by block 314 to collect graphical representation rendering information.

In block 312, a reduction factor and an enlargement factor are determined. In some embodiments, the reduction factor may be a reduction ratio, and the enlargement factor may be an enlargement ratio. The reduction ratio may be used to reduce the empty regions (e.g., regions 260 and 280 in FIG. 2B). The enlargement ratio may be used to enlarge the data regions (e.g., regions 250, 270, and 290 in FIG. 2B). In some embodiments, assuming that a target empty region portion is 20% of entire graphical representation 200, and an actual empty region portion is 70% of graphical representation 200. In some embodiments, the reduction ratio may be a ratio of the actual empty region portion (i.e., 70%) to the target empty region portion (i.e., 20%). Accordingly, the reduction ratio is 3.5 and the actual empty region is reduced 3.5 times so that the empty region portion is reduced from 70% to 20% of the graphical representation 200. In some embodiments, the enlargement ratio may be a ratio of (1—the target empty region portion) to (1—the actual empty region portion). Accordingly, the enlargement ratio is (1-20%)/(1-70%), 8/3. According to the enlargement ratio, the actual data regions are enlarged 8/3 times. In some other embodiments, the reduction factor may be a first dimension so that the empty regions are reduced to the first dimension. The enlargement factor may include one or more specific dimensions so that any of the data regions may be enlarged to correspond to the one or more specific dimensions. Block 312 may be followed by block 314.

In block 314, graphical representation rendering information is collected. Some example graphical representation rendering information may include, but not limited to, the determined reduction factor and the enlargement factor. According to the graphical representation rendering information, one or more data regions of the graphical representation are enlarged according to the enlargement factor and one or more empty regions of the graphical representation are reduced according to the reduction factor. For example, in conjunction with FIG. 2B, the data regions 250, 270, and 290 are enlarged about 266.7% (i.e., 8/3) and the empty regions 260 and 280 are reduced 350% (i.e., 3.5).

Figure 4A:
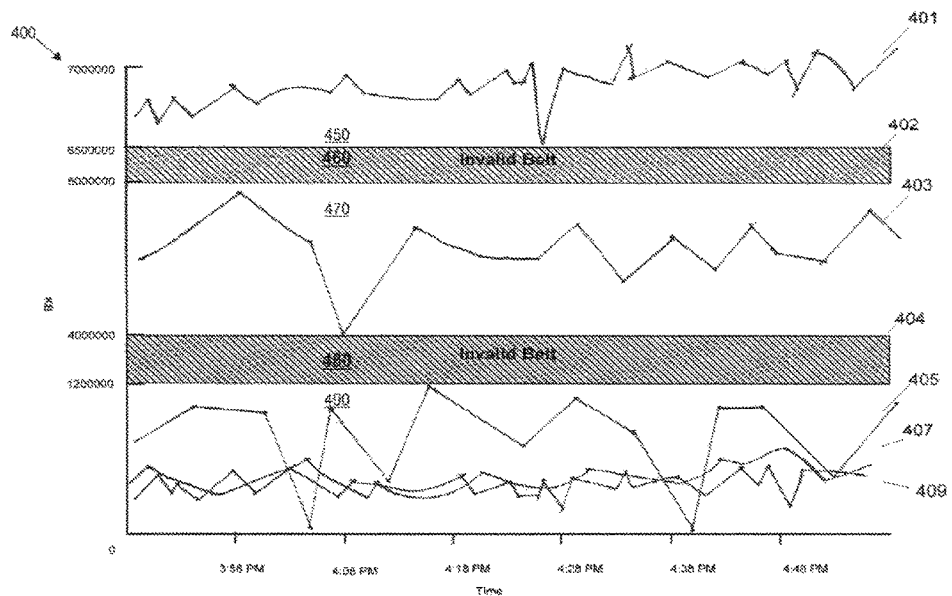
FIG. 4A shows an example graphical representation of a performance data analysis chart, in accordance to at least some examples in the present disclosure.

FIG. 4A shows an example graphical representation 400 of a performance analysis chart, in accordance to at least some examples in the present disclosure. In some embodiments, FIG. 4A shows a graphical representation modified from the graphical representation 200 above. With process 300 described above, data regions 250, 270, and 290 in FIG. 2B are enlarged to data regions 450, 470, and 490 in FIG. 4A, respectively. For example, the first, second, third, fourth and fifth series of resource usage data points are rendered as graphics 401, 403, 405, 407, and 409 in graphical representation 400, respectively. Graphics 402 and 404, representing no resource usage of one or more virtual components and/or physical hardware resources, are also rendered in graphical representation 400. In addition, empty regions 260 and 280 in FIG. 2B are reduced to empty regions 460 and 480 in FIG. 4A. Therefore, data regions 450, 470, and 490 on FIG. 4A are easier to read than data regions 250, 270, and 290 on FIG. 2B.

In some embodiments, a joined data region 490 may include a first curve 405 with a higher variance and other curves 407 and 409 with lower variances. The variances of curves 407 and 409 may be visually overlooked as the high variance of first curve 405.

Figure 4B:
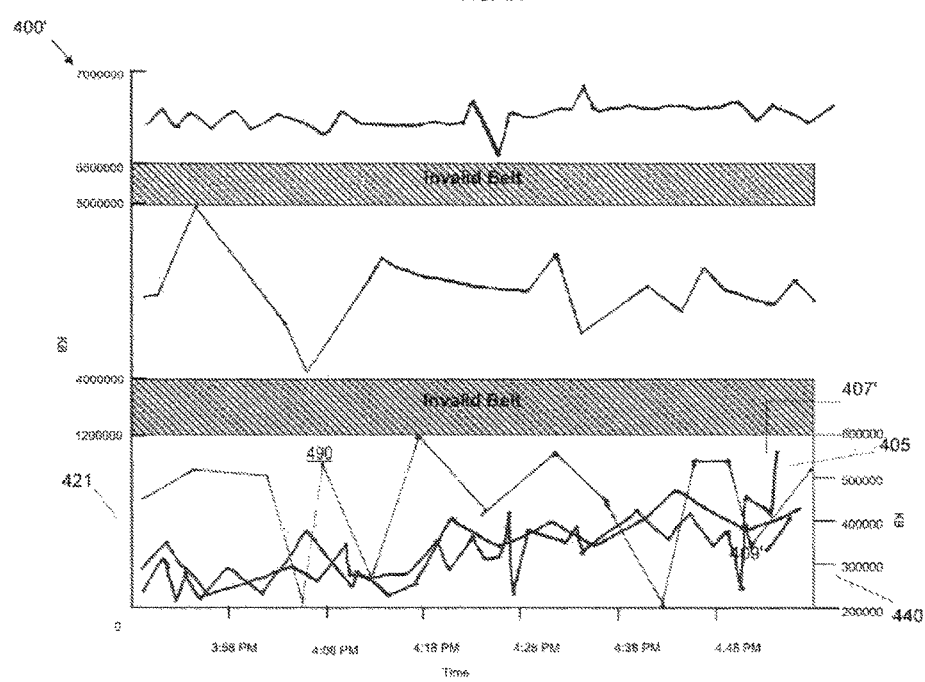
FIG. 4B shows another example graphical representation of a performance data analysis chart, in accordance to at least some examples in the present disclosure.

FIG. 4B shows another example graphical representation 400' of a performance analysis chart, in accordance to at least some examples in the present disclosure. In graphical representation 400', an axis range 421 is used to describe the high variances of first curve 405. In some embodiments, an additional index, for example axis 440, may be used to refer to a specific range of axis range 421. Axis 440 may refer to a range including the variances of curves 407' and 409', but not all the variances of first curve 405. Curves 407' and 409' may refer to axis 440. Therefore, the variance of curves 407' and 409' may be easier to read with respect to axis 440 than with respect to axis range 421.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to present information associated with a group of virtual components in a virtualized environment as a graphical representation rendered on a display, wherein the virtualized environment is supported by physical hardware resources, the method comprising:
   collecting a first resource usage data associated with a virtual component of the group of virtual components, wherein the physical hardware resources is bundled as a resource pool to the virtual component, and the virtual component includes a quest memory that is allocated from the resource pool;
   collecting a second resource usage data associated with the virtual component;
   determining whether a region of a predetermined graphical representation associated with a difference between the first resource usage data and the second resource usage data exceeds a threshold; and
   in response to the region exceeding the threshold:
      collecting first graphical representation rendering information to render the first resource usage data as a first graphic in the graphical representation;
      collecting second graphical representation rendering information to render the second resource usage data as a second graphic in the graphical representation; and
      collecting third graphical representation rendering information including a reduction factor to reduce the region in the predetermined graphical representation to a third graphic in the graphical representation, wherein the third graphic represents no resource usage associated with the virtual component,
      wherein any of the first graphical representation rendering information and the second graphical representation rendering information includes an enlargement ratio or an enlargement dimension, and the reduction factor corresponds to a reduction ratio or a reduction dimension.

2. The method of claim 1, wherein the first resource usage data or the second resource usage data is associated with a memory usage data of the guest memory.

3. The method of claim 1, further comprising collecting a third resource usage data associated with a physical hardware resource of the physical hardware resources from a hypervisor in the virtualized environment.

4. The method of claim 3, wherein the third resource usage data is associated with a memory usage data of a physical server supporting one or more virtual machines in the virtualized environment.

5. The method of claim 4, further comprising collecting fourth graphical representation rendering information to render the third resource usage data as a fourth graphic in the graphical representation.

6. The method of claim 5, wherein the fourth graphical representation rendering information includes the enlargement ratio or the enlargement dimension.

7. The method of claim 1, further comprising determining whether the first resource usage data overlaps with the second resource usage data based on a maximum value and a minimum value of the first resource usage data and a maximum value and a minimum value of the second resource usage data.

8. The method of claim 7, in response to a determination that the first resource usage data overlaps with the second resource usage data, the method further comprising:
   joining the first resource usage data and the second resource usage; and
   identifying a maximum value and a minimum value of the joined resource usage data.

9. The method of claim 8, further comprising determining whether the joined resource usage data overlaps with another resource usage partly based on the maximum value and the minimum value of the joined resource usage data.

10. The method of claim 8, further comprising:
    adding an index to the graphical representation corresponding to the first resource usage data but not corresponding to the second resource usage data; and
    collecting fifth graphical representation rendering information to render the first resource usage data according to the index while keeping the second graphical representation rendering information unchanged to render the second resource usage data.

11. A computer system configured to monitor resource usage information associated with a group of virtual components in a virtualized environment, wherein the virtualized environment is supported by physical hardware resources, the computer system comprising a processor, a memory, and a display and the processor being programmed to:
    collect a first set of resource usage data associated with one or more virtual components of the group of virtual components from a server configured to manage the group of virtual components, wherein the physical hardware resources is bundled as a resource pool to the one or more virtual components, and the one or more virtual components includes guest memories that are allocated from the resource pool;
    obtain a graphical representation of the first set of resource usage data;
    determine a region of the graphical representation that is associated with no resource usage of any of the virtual components and the physical hardware resources;
    in response to the region exceeding a first threshold, collect graphical representation rendering information including an enlargement ratio or an enlargement dimension to render the first set of resource usage data as first graphics associated with the one or more virtual components in the graphical representation on the display, and including a reduction factor having a reduction ratio or a reduction dimension to reduce the region and to render the reduced region on the display, wherein a ratio of the first graphics to the graphical representation in its entirety exceeds a second threshold.

12. The computer system of claim 11, wherein the processor is further programmed to:
    collect a second set of resource usage data associated with the physical hardware resources;
    collect the graphical representation rendering information to render the second set of resource usage data associated with the physical hardware resources as second graphics in the graphical representation on the display.

13. The computer system of claim 12, wherein any of the first graphics and the second graphics refers to a memory usage amount associated with the guest memories.

14. The computer system of claim 11, wherein the graphical representation further comprises a graphic representing the no resource usage, wherein a ratio of the graphic representing the no resource usage to the graphical representation in its entirety is less than a third threshold.

15. A non-transitory computer-readable storage medium that includes a set of instructions which, in response to execution by a processor, causes the processor to perform a method to monitor resource usage information associated with a group of virtual components in a virtualized environment, wherein the virtualized environment is supported by physical hardware resources, the method comprising:

collecting a first resource usage data associated with a virtual component of the group of virtual components, wherein the physical hardware resources is bundled as a resource pool to the virtual component, and the virtual component includes a quest memory that is allocated from the resource pool;

collecting a second resource usage data associated with the virtual component;

determining a first region in a predetermined graphical representation to be rendered on a display in the virtualized computing environment, wherein the first region is defined by a maximum value and a minimum value of the first resource usage data;

determining a second region in the predetermined graphical representation to be rendered on the display in the virtualized computing environment, wherein the second region is defined by a maximum value and a minimum value of the second resource usage data; and in response to the first region overlaps the second region in the predetermined graphical representation, collecting graphical representation rendering information to render a first graphic and a second graphic in a graphical representation with a first enlargement factor including an enlargement ratio or an enlargement dimension, wherein the first graphic corresponds to the first resource usage data and the second graphic corresponds to the second resource usage data.

16. The non-transitory computer-readable storage medium of claim 15, the method comprising including a second enlargement factor in the graphical representation rendering information to enlarge the first graphic in the graphical representation, wherein the second graphic is rendered partly based on the first enlargement factor only, but not on the second enlargement factor.

17. The non-transitory computer-readable storage medium of claim 16, wherein the second enlargement factor amplifies a variation of the first resource usage data.

* * * * *